United States Patent [19]

Brotzmann et al.

[11] Patent Number: 4,772,318

[45] Date of Patent: Sep. 20, 1988

[54] PROCESS FOR THE PRODUCTION OF STEEL FROM SCRAP

[75] Inventors: Karl Brotzmann, Sulzbach-Rosenberg, Fed. Rep. of Germany; Richard E. Turner, deceased, late of Sulzbach-Rosenberg, Fed. Rep. of Germany, by Trenna R. Turner, heiress

[73] Assignee: Klöckner CRA Technologie GmbH, Duisburg, Fed. Rep. of Germany

[21] Appl. No.: 21,694

[22] Filed: Mar. 4, 1987

[30] Foreign Application Priority Data

Mar. 8, 1986 [DE]  Fed. Rep. of Germany ....... 3607777

[51] Int. Cl.$^4$ ............................................... C22B 4/00
[52] U.S. Cl. ................................... 75/59.17; 75/51.2; 75/51.6; 75/59.19
[58] Field of Search ................... 75/59.17, 59.19, 51.2, 75/51.6

[56] References Cited

U.S. PATENT DOCUMENTS

| | | | |
|---|---|---|---|
| 4,198,230 | 4/1980 | Brotzmann | 75/51.2 |
| 4,365,992 | 12/1982 | Sieckman | 75/51.6 |
| 4,497,656 | 2/1985 | Robert | 75/51.6 |
| 4,537,629 | 8/1985 | Lazcano-Navarro | 75/51.2 |

*Primary Examiner*—Peter D. Rosenberg
*Attorney, Agent, or Firm*—Toren, McGeady & Associates

[57] ABSTRACT

In a process for the production of steel from scrap in a refining vessel having feed nozzles below the surface of the steel bath and top-blowing devices and in which carbonaceous solid fuel and oxygen-containing gases are used as reagents, the same reagents are used to supply heat to the scrap and to the melt in the refining vessel and the resulting gaseous reaction products are after-burned with preheated air.

5 Claims, No Drawings

PROCESS FOR THE PRODUCTION OF STEEL FROM SCRAP

TECHNICAL FIELD OF THE INVENTION

The invention relates to a process for the production of steel from scrap in a refining vessel having feed nozzles below the surface of the steel bath and top-blowing devices and in which carbonaceous solid fuels and oxygen-containing gases are used as reagents.

BACKGROUND OF THE INVENTION AND PRIOR ART

The relevant state of the art in this field includes processes in which coal and coke are used as suppliers of energy, with oxygen as oxidant, to melt down scrap. A very advantageous process of this kind is described in German Patent No. 28 38 983.

In this known process carbonaceous fuels and oxygen are introduced beneath the surface of the melt bath while additional oxygen is blown in as a free jet on to the surface of the bath so that the reaction gases are after-burned and a substantial part of the heat thus generated is transferred to the bath. The best results are obtained in this process when about 70% of the amount of oxygen required is blown on to the bath and the rest of the oxygen enters the melt with the coal beneath the surface of the bath.

Under these conditions up to about 30% after-burning is achieved with an efficiency of retransfer of the heat of combustion to the bath of about 80%. The remaining 20% of the heat of combustion remains in the exhaust gas and accordingly leads to an increase in the temperature of the exhaust gas.

In using the process it has further been found that an increase in the degree of after-burning generally leads to a decrease in the efficiency of retransfer of the heat generated to the bath. In practice about 20% lower heat transfer means an increase of about 200° C. in the exhaust gas temperature. Thus under the given conditions there is a practical limit to the use of the process at about 30% after-burning of the exhaust gases, since further increase in the after-burning impairs the service life of the refractory lining too much owing to the increased temperature stress. Even so the known process has considerable advantages, since for example, using coke as fuel and about 30% after-burning, about 1.5 times as much heat is available as in a process without after-burning.

OBJECT OF THE INVENTION

The object of the present invention is to provide a process that enables the calorific value of the carbonaceous solid fuel to be better utilised in the production of steel from scrap so as to increase the heat recovery and thereby improve the economy, and furthermore to provide a process for the production of steel from scrap that is operationally simple to use.

SUMMARY OF THE INVENTION

The solution of this problem consists, according to the invention, in using the same reagents for the supply of heat to the scrap and to the melt in the refining vessel and in after-burning the resulting gaseous reaction products with preheated air. In the process according to the invention heat obtained by the combustion of solid fuel is thus also supplied to the scrap during melting down. The air for the after-burning can also be enriched with oxygen. However on economic grounds only slight enrichment is possible, since the use of oxygen is expensive.

In the process of the invention scrap is first charged into a refining vessel, for example a converter having nozzles preferably made up of concentric tubes beneath the bath surface. The nozzles lie beneath the bath surface when the whole charge is molten; they can be built into the bottom and/or the side walls of the vessel. There are further nozzles and/or a lance above the bath surface.

Solid fuel that is burned during preheating and melting down of the scrap by means of oxygen blown in through the nozzles into the lower part of the refining vessel can be charged together with the scrap. As soon as a melt is formed from the preheated scrap, or molten crude iron is subsequently charged, powdered fuel can also be blown into the refining vessel.

The process according to the invention takes place in three phases: the preheating phase, the melting-down phase and the refining phase. In all three phases the combustion or refining gases, as the case may be, arising in the refining vessel undergo after-burning. Only in the refining phase—particularly towards the end of the refining—may the after-burning be omitted in some circumstances.

In both the preheating and melting-down phases heat from the combustion of solid fuels and from the after-burning with preheated air is supplied to the scrap and to the melt formed therefrom.

According to the invention the process can be operated with air preheated to any desired temperature. A preferred temperature range for preheating the air is between about 800° and 1300° C. For example optimum after-burning rates can be obtained during preheating the scrap, in the scrap melting-down phase and in the melt phase proper with about a 1200° C. hot blast.

Compared with the use of oxygen for after-burning and the experience gained in doing so it has surprisingly been found that the degree of after-burning can be substantially increased when air, preferably preheated to about 800° to 1300° C., is used in the form of a free jet instead of oxygen. This unpredictable effect has been found in both preheating and melting down the scrap and in top-blowing the melt. For example in the melting-down phase from 60 to 70% after-burning, and in the melt phase from 40 to 60%, can be obtained with good retransfer of the heat generated to the scrap or to the melt, i.e. with an efficiency of better than 80%. Accordingly the increase in the exhaust gas temperature is at most 200° C., which does not lead to excessive stress on the refractory lining of the refining vessel.

According to the invention, in order to bring about good retransfer of the energy of after-burning to the heap of scrap or to the melt, the top-blowing devices, preferably nozzles in the refractory brickwork in the upper part of the refining vessel, or suitably constructed lances, are so arranged that the following relationship holds between the nozzle inlet pressure (the pressure in front of the nozzle opening), the nozzle diameter and the distance between the nozzle opening and the point of impingement:

$$D \cdot \sqrt{P} = L/(8 \text{ to } 12)$$

where
$P$ = nozzle inlet air pressure

D = nozzle diameter
L = path length of the top-blowing jet

In the process according to the invention the carbonaceous solid fuels used are primarily coal and/or coke; for example coke can also be charged into the refining vessel together with scrap.

According to the invention the addition of solid carbonaceous energy carriers can be performed in various ways. For example coke and/or coal can be charged in the form of lumps in front of the oxygen feed nozzles that are located beneath the surface of the molten steel bath and are arranged in the bottom and/or the lower side walls. For example four oxygen feed nozzles with jackets for a protective medium can be arranged around the refining vessel in the lower part of the walls and then, for example, coke can be charged in front of these oxygen nozzles in the form of lumps.

A preferred embodiment of the invention consists in blowing coke and/or coal in the form of dust through nozzles into the refining vessel. It has been found advantageous if the region of the surface of the scrap on which the carbonaceous solid fuel impinges is already molten. This can for example be brought about by supplying additional energy by means of special burners or by electrical energy. If the surface of the scrap is not melted or beginning to melt the stream of fuel can even cool the surface of the scrap, leading to undesired formation of carbon in the refining vessel.

According to the invention, when the carbonaceous solid fuel is blown in through nozzles beneath the surface of the bath oxygen feed nozzles may be arranged near them so that the blast jets point in approximately the same direction so that during heating of the scrap, for example, they impinge on the surface of the scrap in the same region. An advantageous injection device is a nozzle comprising three concentric tubes in which for example powdered coal flows through the central tube, oxygen through the first annular passage and the nozzle protecting medium through the second annular passage. The so-called circular slot nozzles described in German Patent No. 24 38 142 have been found equally satisfactory.

A further advantageous embodiment of the process according to the invention consists in top-blowing part of the carbonaceous solid fuel together with the afterburning jet. Here it has surprisingly been found that the surface of the scrap in the impingement region is already molten shortly after the start of the blowing with the hot blast top-blowing jet, and that the fuel particles are taken up by the molten surface, react there with the oxygen and thus assist the melting down of the scrap by the evolution of heat. According to the invention carbonaceous solid fuels, for example coals of different particle sizes, are used here. The best results in respect of the utilisation of the calorific value of these fuels can be attained by using powered coal with a maximum particle diameter of 0.1 mm during the period in which the after-burning jet impinges on solid scrap, and subsequently using coarser coal with a particle size up to about 1 mm when the after-burning stream preferably impinges on the melt.

The exhaust gases leaving the refining vessel during the scrap preheating and melting-down phases of the process of the invention have a degree of oxidation of about 60 to 80%, and during the refining phase of about 40 to 50%. The exhaust gases from the first phase can be used for preheating scrap by transfer of their sensible heat to the scrap. At the same time the heat supply can be further increased by passing in hot air to complete the combustion of the exhaust gases.

The exhaust gases from the second refining phase can be collected separately and used for example to heat a recuperator, e.g. a pebble heater, since their relatively smaller content of carbon monoxide of for example 10 to 20% does not permit their use as reduction gas.

DETAILED DESCRIPTION OF A PREFERRED EMBODIMENT OF THE INVENTION

The present invention will now be explained in more detail with reference to the following non-limiting example.

In a 60 tonne hearth-type furnace vessel having approximately the same dimensions as an equivalent electric furnace four oxygen feed nozzles having an internal diameter of 8 mm are arranged in the base and four are uniformly arranged in the side walls immediately above the base. Oxygen in an amount of about 2 $Nm^3$/min. is blown in through each nozzle. A 250 kg portion of lump coke is placed in front of each of these nozzles.

In the roof of the furnace, approximately above the concentric tube oxygen feed nozzles are four hot air nozzles with a diameter of about 20 cm. In addition to the coke charged with the scrap, a total of about 5 tonnes of coal are blown into the refining vessel. About half of this is blown in together with the hot blast through a central tube in the hot blast feed nozzles mentioned above, and the rest of the coal is blown in through four coal feed nozzles arranged in the neighbourhood of the above-mentioned oxygen feed nozzles.

In carrying out the process of the invention oxygen is fed in at the start through the bottom nozzles and at first only a hot blast is fed into the refining vessel through the top-blowing nozzles. After about 3 minutes the blowing in of coal is begun, simultaneously through the bottom nozzles and the top-blowing nozzles. The blowing rate is about 15 kg per nozzle per minute. It has been found advantageous to use initially fine granular coal with a maximum particle diameter of about 0.1 mm during the first 15 minutes of blowing time and then to change, at least in the top-blowing jets, to a coarser coal with a maximum particle size of about 1 mm.

We claim:

1. A process for the production of steel from scrap in a refining vessel, comprising charging scrap into the refining vessel through feed nozzles arranged below the surface of a steel bath in the refining vessel, introducing carbonaceous solid fuels into the vessel and burning the carbonaceous solid fuels with oxygen-containing gases for a preheating step of the scrap and a melting step, and introducing preheated air into the vessel through top-flowing devices for after-burning the resulting gaseous reaction products emitted from the melt.

2. The process according to claim 1, wherein the top-blowing devices have a nozzle inlet and the nozzle inlet has a nozzle diameter, comprising operating the top-blowing devices with the relationship between the nozzle inlet pressure of the preheated air P, nozzle diameter D and the path length L of the air between the nozzle opening and the point of impingement being $D \cdot \sqrt{P} = L/(8 \text{ to } 12)$.

3. The process according to claim 1, wherein different proportions of the scrap and the carbonaceous solid fuels are introduced during the preheating step and the melting step.

4. The process according to claim 1, wherein the carbonaceous solid fuels have varying particle sizes.

5. The process according to claim 1, wherein carbonaceous solid fuels having a maximum particle diameter of about 0.1 mm are introduced during the preheating step and the melting step.

* * * * *